(12) United States Patent
Kemmler et al.

(10) Patent No.: US 9,026,557 B2
(45) Date of Patent: May 5, 2015

(54) SCHEMA MAPPING BASED ON DATA VIEWS AND DATABASE TABLES

(75) Inventors: Andreas Kemmler, Boennigheim (DE); Torsten Kamenz, Wiesloch (DE)

(73) Assignee: SAP SE, Walldorf (DE)

(*) Notice: Subject to any disclaimer, the term of this patent is extended or adjusted under 35 U.S.C. 154(b) by 235 days.

(21) Appl. No.: 13/602,661

(22) Filed: Sep. 4, 2012

(65) Prior Publication Data
US 2014/0067868 A1 Mar. 6, 2014

(51) Int. Cl.
*G06F 17/30* (2006.01)
(52) U.S. Cl.
CPC .... *G06F 17/30595* (2013.01); *G06F 17/30557* (2013.01)
(58) Field of Classification Search
CPC .............. G06F 17/30595; G06F 17/30292; G06F 17/30557; G06F 17/30607
USPC ......................................... 707/796, 802, 803
See application file for complete search history.

(56) References Cited

U.S. PATENT DOCUMENTS

| 6,718,320 | B1* | 4/2004 | Subramanian et al. ....... 707/719 |
| 2003/0046292 | A1* | 3/2003 | Subramanian et al. ....... 707/100 |
| 2008/0071844 | A1* | 3/2008 | Gopal et al. .................. 707/204 |
| 2010/0306279 | A1* | 12/2010 | Fan et al. ...................... 707/803 |

OTHER PUBLICATIONS

Jinsoo Park, "Schema Integration Methodology and Toolkit for Heterogeneous and Distributed Geographic Databases", Aug. 2001, pp. 1-23.*
Yannis Katsis, et al.; "View-Based Data Integration"; Computer Science and Engineering, U.C. San Diego; Jan. 1, 2009; retrieved from the Internet, http://db.ucsd.edu/pubsFileFolder/355; 8 pages.
Maciej Gawinecki; "How Scheme Mapping Can Help in Data Integration?—Integrating the Relational Databases with Ontologies"; ICT School, Computer Science; Jan. 1, 2008; Modena, Italy; 4 pages.
Piotr Piotrowski, et al.; "Knowledge Base Views"; Proceedings of the 2008 1st International Conference on Information Technology, IT 2008; Gadansk University of Technology, Gadansk, Poland; May 18, 2008; 4 pages.
Li Xu, et al.; "Using Schema Mapping to Facilitate Data Integration"; Department of Computer Science, Brigham Young University, Provo, Utah; Jan. 1, 2003; retrieved from the Internet, http://www.deg.byu/papers/integration.ER03.pdf; retrieved on Nov. 21, 2013; 27 pages.
Extended European Search Report filed in European Patent Application No. 13004201.3, mailed on Nov. 28, 2013; 7 pages.

* cited by examiner

*Primary Examiner* — Etienne Leroux
*Assistant Examiner* — Jared Bibbee
(74) *Attorney, Agent, or Firm* — Fountainhead Law Group PC

(57) ABSTRACT

Schema mapping is provided at several levels of granularity to generate views from a data model. The schema mapping allows for the database tables referenced among the data views contained in the data model to come from a collection of several physical schemas, even though the data model may comprise a single authoring schema.

20 Claims, 9 Drawing Sheets

SCHEMA MAPPING BASED ON DATA VIEWS AND DATABASE TABLES

BACKGROUND

Unless otherwise indicated herein, the approaches described in this section are not prior art to the claims in this application and are not admitted to be prior art by inclusion in this section.

Enterprise systems quite often use multiple enterprise resource planning (ERP) systems. As an illustrative example, an ERP system may be used as a human resources (HR) system, and a separate ERP installation may be used as a financial services system. This is not an uncommon configuration since HR systems are typically de-centrally owned and require a different security policy than the financial services system. In another scenario, a single ERP system may be partitioned into different systems.

In order to consolidate their data operations, enterprises may migrate their separate data systems into a single database system such as the SAP HANA® database product, which is an in-memory database system having integrated analytics capability. The enterprise customer, for example, may migrate their separate ERP systems into separate database schemas in the single database system. For example, a database schema may be defined for the HR system and another different database schema may be defined for the financial services system.

Data modeling is a tool used by the enterprise customer so they can understand and use the data that is accumulated in their data systems, such as their HR system and their financial services system. In the scenario where there is consolidation of previously separate data systems into a single database system, it is important that data modeling capability is not compromised and remains accessible to the enterprise customer.

DETAILED DESCRIPTION

Disclosed embodiments relate to generating data views using enhanced schema mapping. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
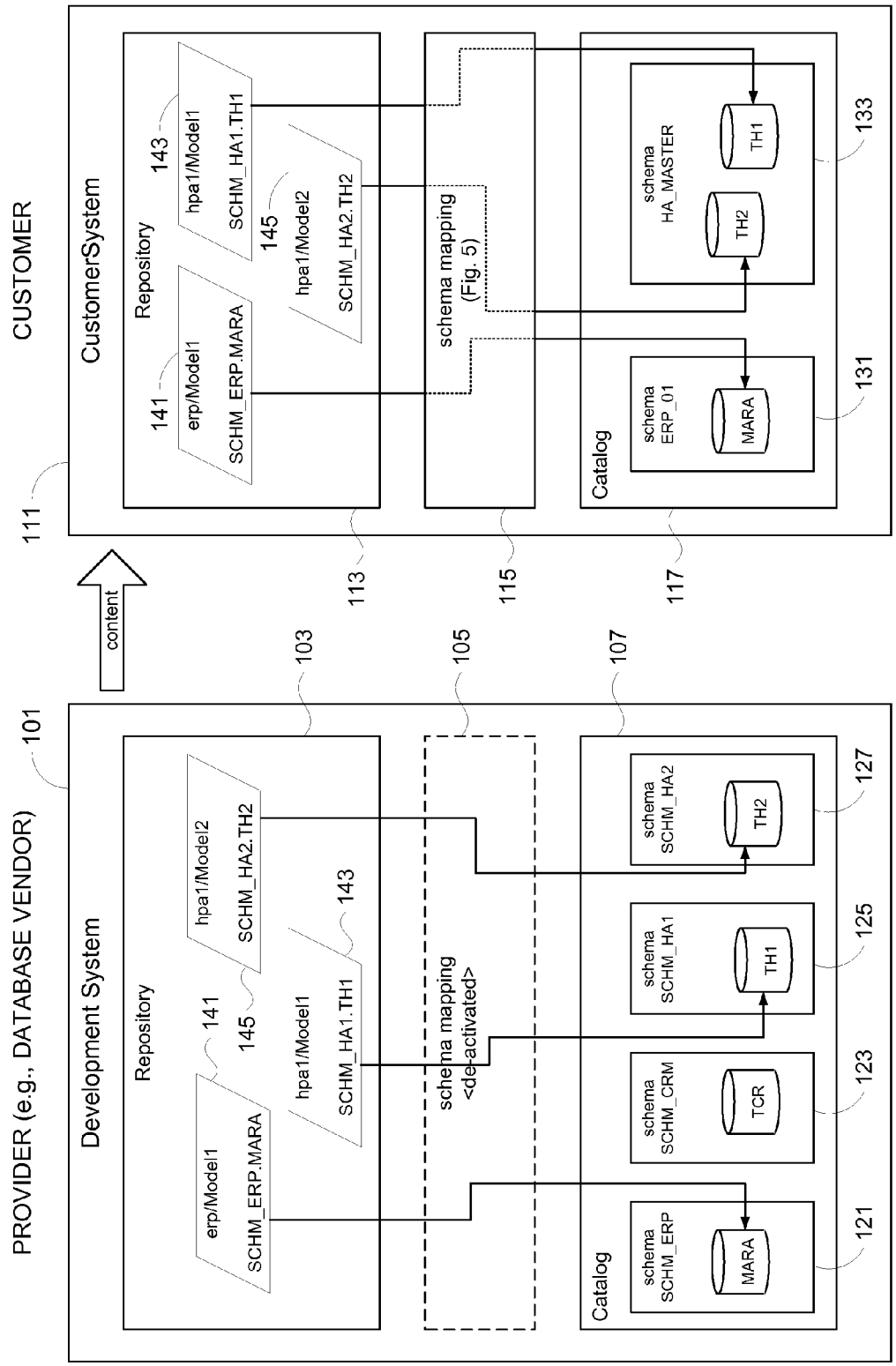
FIG. 1 illustrates a system configuration in accordance with the present disclosure.

FIG. 1 shows a configuration of a typical embodiment in accordance with the present disclosure. A provider may develop data models on development system 101 and distribute the data models to customers for use on their customer systems 111. For example, the provider may be database vendor, providing data modeling services to support its various customers, and delivering those data models to the customers to use on their installed database systems.

The development system 101 may comprise an underlying database system having a repository 103 of data models 141, 143, 145, a schema mapping module 105, and a catalog 107. The development system 101 may be based on the same database product that is installed in the customer system. For example, SAP, Inc. makes and sells the SAP HANA® database product. Accordingly, the development system 101 may be based on the same database product as the customers' database product so that the provider's operating environment for developing content is the same as the operating environment of its customers.

The repository 103 may be a data store (e.g., a library) of data models 141-145 that the provider develops and delivers to customers. The figure shows three illustrative data models 141, 143, 145, respectively named erp/Model1, hpa1/Model1, and hpa1/Model2.

The schema mapping module 105 may be inactive or not otherwise used in the development system 101. The reason for this will be made clear in the context of the discussion of the customer system 111.

The underlying database system may include a catalog 107 of database schemas 121, 123, 125, 127. The database schemas 121, 123, 125, 127 may be copies of database schemas defined and deployed in customer systems of the provider's customers.

The provider may develop data models 141-145. A data model may reference one or more of the database schemas 121-127 stored in the catalog 107. For example, the data model 141 references the database schema 121, and in particular a database table called MARA in that database schema. The reference SCHM_ERP.MARA in the data model 141 identifies the database schema SCHM_ERP and identifies the database table MARA within that database schema. Similarly, data model 143 identifies the database schema SCHM_HA1 and identifies the database table TH1. And data model 145 identifies the database schema SCHM_HA2 and identifies the database table TH2 within the database schema. A typical data model may contain several (e.g., tens to hundreds) data views and may reference several database tables in order to generate the data views.

The database schemas 121-127 in the development system 101 do not contain real data. Instead, the database schemas 121-127 may contain "dummy" data so that the provider can develop the data models 141-145, which can then be deployed to the customers to be applied on their actual data. For this reason, the database schemas 121-127 may be referred to as "authoring schemas" to emphasize that they are simply used to author the data models.

The customer system 111 may be include a repository 113, a schema mapping module 115, and a catalog 117. Some of the data models 141-145 from the provider may be deployed in the repository 113, and in particular only those data models that are relevant to the customer.

The catalog 117 may contain one or more database schemas 131, 133. Unlike the database schemas 121-127 in the development system 101, which contain dummy data, the database schemas 131, 133 in the customer system 111 reference actual data collected from the customer's operations and business systems. Accordingly, the customer's database schemas 131, 133 may be referred to as "physical schemas" to distinguish from the provider's "authoring schemas" and to emphasize that these database schemas contain real data.

In general, a customer's configuration of database schemas 131, 133 may not correspond one-to-one with the provider's database schemas 121-127. For example, the provider's database schema 121 is identified as SCHM_ERP in the development system 101, but the corresponding database schema 131 in the customer system 111 is identified as ERP_01. As another example, the provider's database tables TH1 and TH2 are stored in separate database schemas 125 (SCHM_HA1) and 127 (SCHM_HA2), respectively, in development system 101, while in the customer system 111, the database tables TH1 and TH2 are stored in a single database schema 133 named HA_MASTER. In general, different customers are likely to have different configurations of database schemas on their systems.

In practice, the provider may develop data models 141-145 for their customers with reference to the configuration of database schemas 121-127 in the provider's development system 101. It may be impractical to maintain data models that are customized for each customer's configuration of database schemas. Accordingly, the schema mapping module 115 in the customer system 111 may be activated to provide mapping functionality. In particular, the schema mapping module 115 may map the database schema (authoring schema) references made in the data models 141-145 to database schema reference that are specific to the customer's database schemas (physical schemas). For example, the data model 141 refers to a database schema named SCHM_ERP. The mapping module 115 may map the database schema name to ERP_01, which is the name of the corresponding database schema in the customer system 111. Likewise, the mapping module 115 may map SCHM_HA1 in data model 143 to HA_MASTER, and SCHM_HA2 in data model 145 to HA_MASTER. This aspect of the present disclosure will be discussed in more detail below.

Referring back to the schema mapping module 105 in development system 101, it can now be appreciated why the schema mapping module in the development system 101 is not active. Since the data models 141-145 are developed and defined using the database schemas 121-127 contained in catalog 107, there is no need for the schema mapping module 105 to perform mapping. On the other hand, the schema mapping module 115 in the customer system 111 may need to be activated in order to map authoring schema references made in the data models 141-145 to the customer's physical schema references.

Figure 2A:
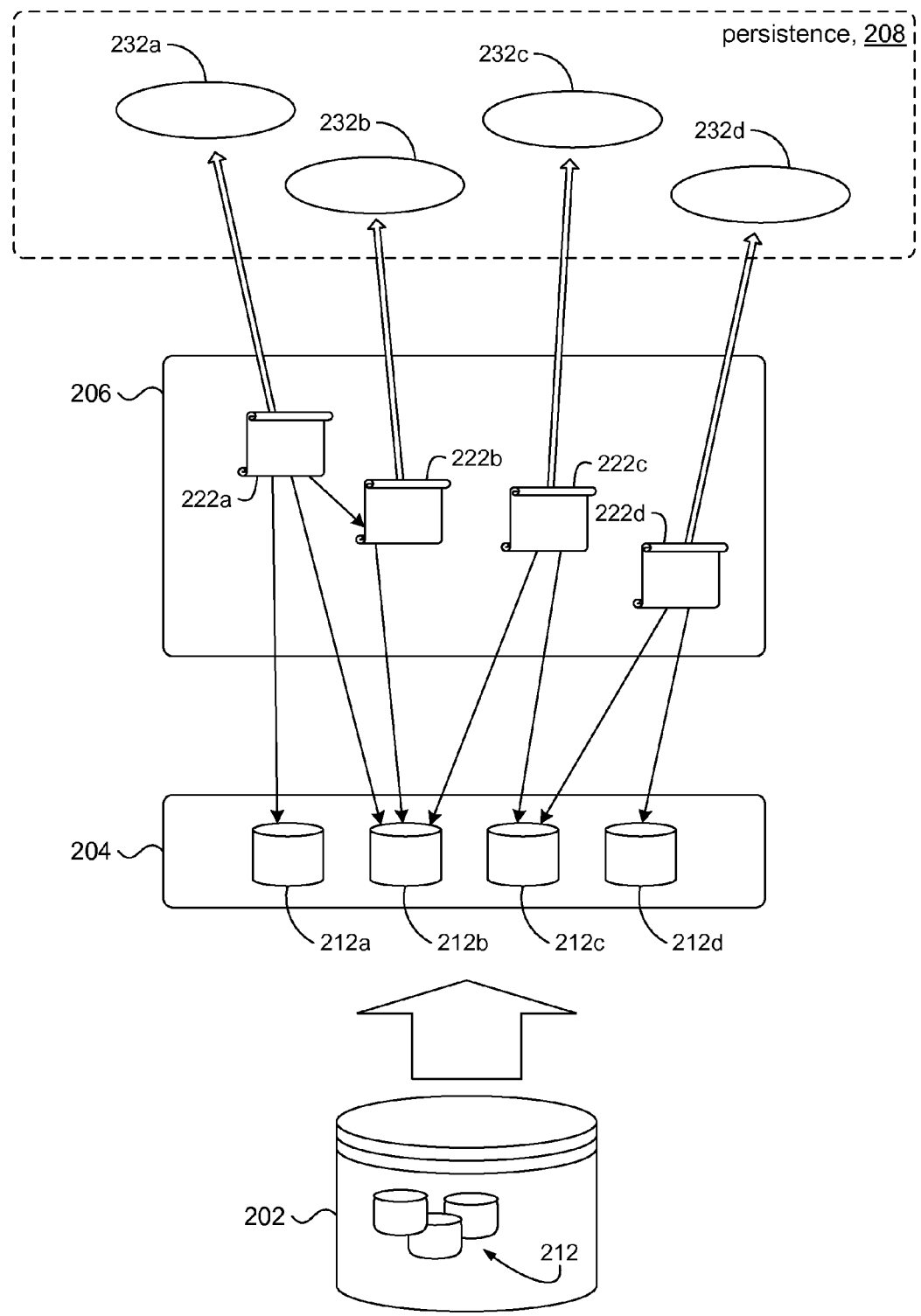
FIG. 2A illustrates elements involved in generating a view in a data model.

Refer now to FIG. 2A for additional details about the database schemas and data models illustrated in FIG. 1. Enterprise data for an enterprise may be stored in a database 202, and in particular the data may be stored among several database tables 212 that comprise the database. The database 202 may be organized in one more database schemas (schemas) 204, which define and organize database tables 212*a*, 212*b*, 212*c*, and 212*d* in a manner that is useful to the enterprise. For example, a database schema may be defined the database 202 to organize and manage the data for the HR group. A separate database schema may be defined in the database 202 to organize and manage the data for the financial group.

Data models (data view models, view models) 206 may be defined to view the data comprising the database schema 204. The data model 206 may comprise database operations (SELECT, PROJECT, JOIN, etc.) that manipulate the database tables 212*a*-212*d* and aggregate operations (SUM, AVERAGE, etc.) that perform analytics on the data to generate views 232*a*, 232*b*, 232*c*, 232*d*. The generated views 232*a*-232*d* may be presented to the user on a display device (e.g., computer display, computer tablet, mobile device, etc.), or a generated view may be printed (e.g., printing a report), and so on. The generated views 232*a*-232*d* may be persisted, for example, on a data storage system 208.

The database operations and analytics used to generate a given view (e.g., view 232*a*) may be referred to herein as a "data view definition" or a "view definition." The data model 206 may comprise many such data view definitions 222*a*, 222*b*, 222*c*, 222*d*. A data view definition (e.g., 222*a*) may include references to one or more database tables 212*a*-212*d*, and a reference to the database schema that contain (instantiate) the database tables. For example, data view definition 222*a* refers to database tables 212*a* and 212*b* in the database schema 204. A data view definition may include a reference to one or more views generated by other data view definitions. For example, data view definition 222*a* includes a reference to data view definition 222*b*, and so will use the data from the view 232*b* that is generated from data view definition 222*b*, in addition to data tables 212*a*, 212*b*.

Figure 2B:
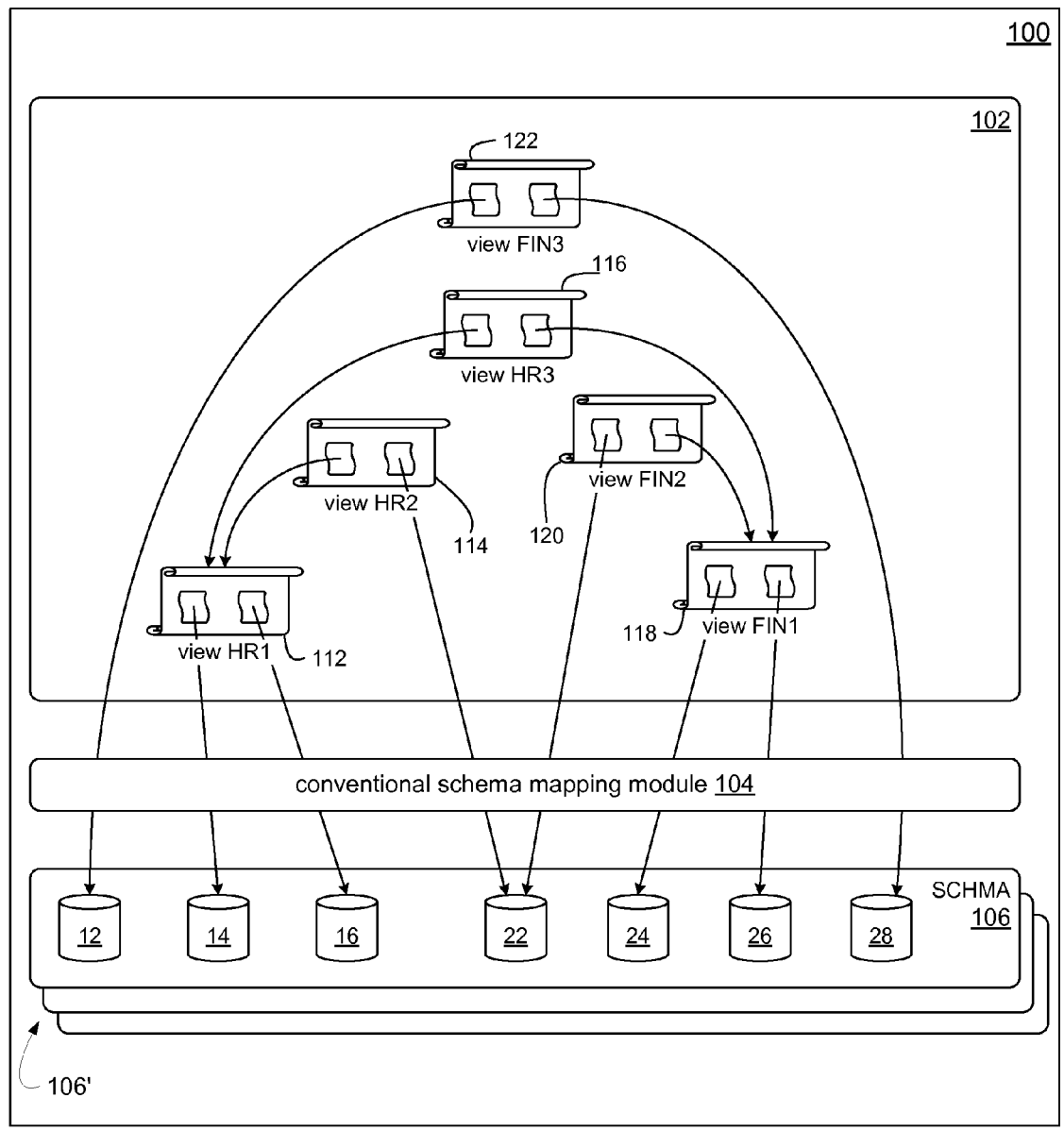
FIG. 2B illustrates a conventional schema mapping scenario.
Figure 2C:
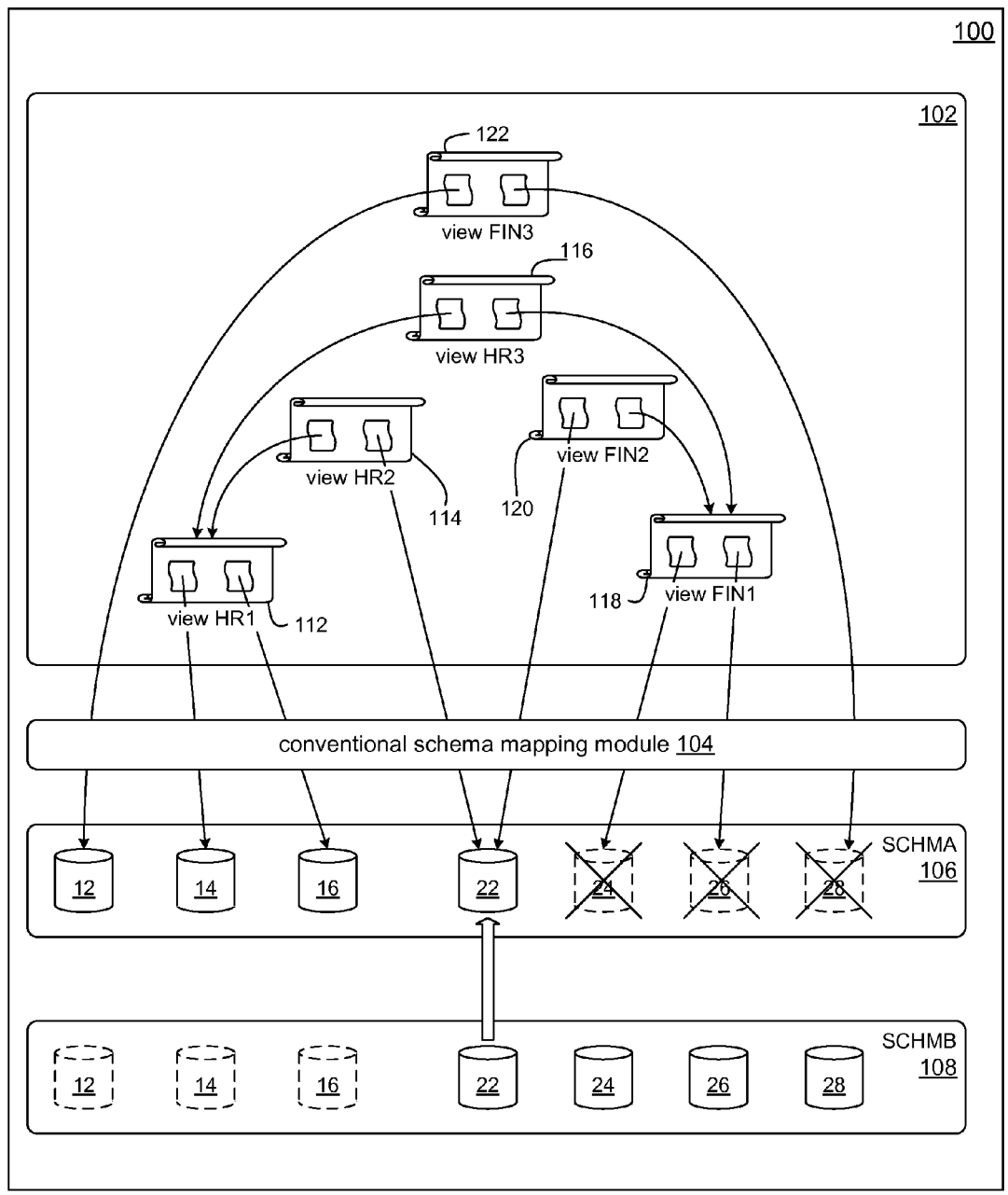
FIGS. 2C and 2D illustrate limitations in the conventional schema mapping scenario.
Figure 2D:
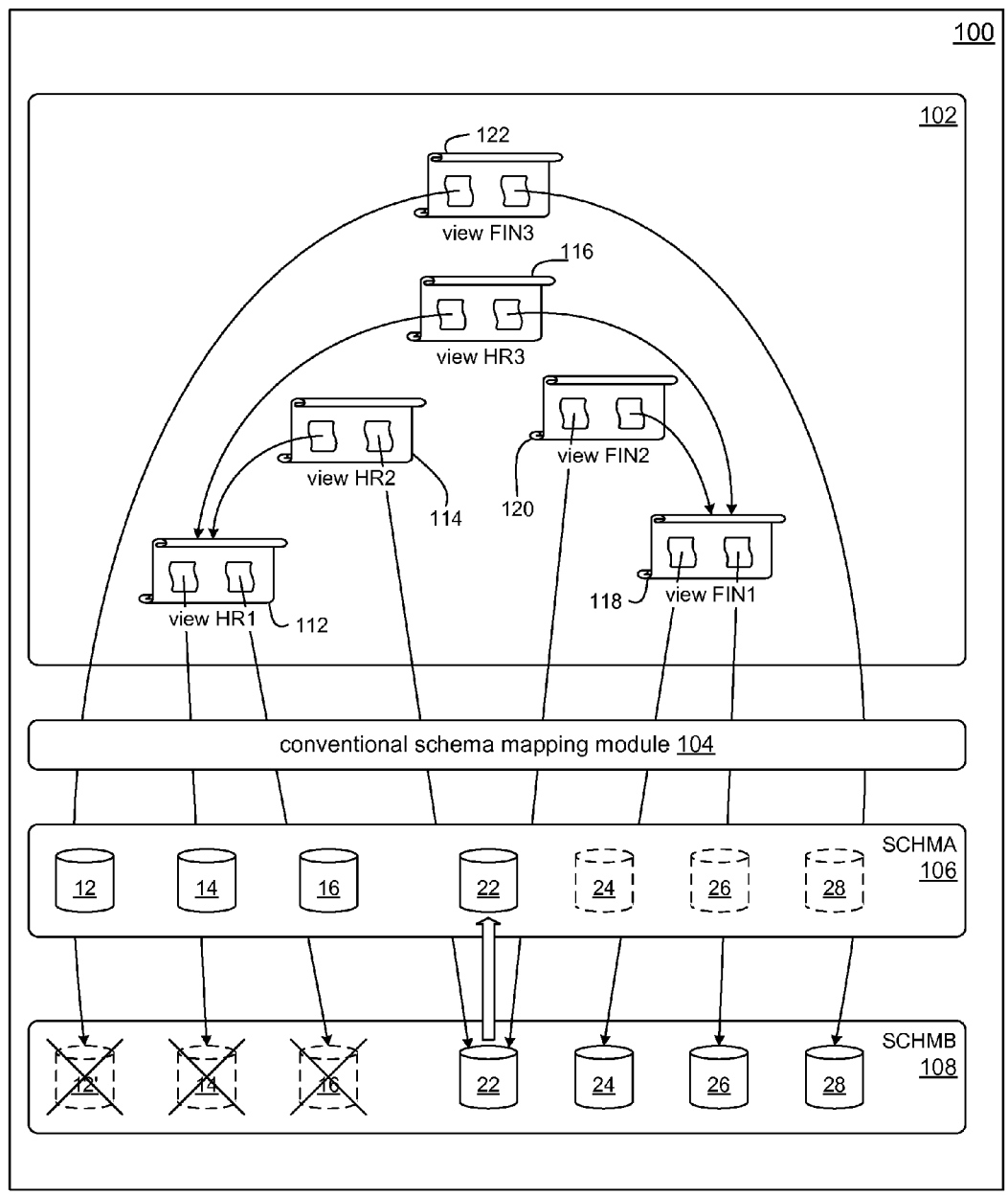

FIGS. 2B-2D set up an example to illustrate advantageous aspects of the present disclosure. In FIG. 2B, a system 100 may include a data model 102 (e.g., received from a provider) comprising a plurality of data view definitions 112-122. As explained above, the data view definitions 112-122 in the data model 102 may make reference to the authoring schema on the provider's development system (e.g., development system 101). Accordingly, the system 100 may include a conventional schema mapping module 104 to map the authoring schema (e.g., SCHM_ERP) referenced in the data model 102 vis-à-vis the data view definitions 112-122 to one of the database schemas 106' in system 100. For example, a user (e.g., administrative user) of system 100 may know that the authoring schema SCHM_ERP corresponds to database schema 106 in their system, and configure the schema mapping module 104 to map database schema SCHM_ERP to database schema 106 (SCHMA).

Referring to FIG. 2C, in some usage scenarios, the database tables that are referenced in a data model 102 may come from different physical schemas in a given enterprise. For example, database tables 12-16, shown in FIG. 2C, may contain information from a human resources department while database tables 22-28 may contain the enterprise's financial information. The enterprise may desire to keep the two kinds of information separate, and therefore may configure database schemas 106, 108, for example, to hold respective database tables 12-16 and database tables 22-28. The figure shows that one of the financial database tables 22 may be replicated in database schema 106, to illustrate that, despite the separate deployment of database schemas, certain data in the enterprise may nonetheless need to crossover between database schemas.

In the configuration shown in FIG. 2C, the data view definition 112, identified as view HR1, is associated with database schema 106 since the data view definition makes reference to database tables 14 and 16, which come from database schema 106. Data view definition 118, identified as view FIN1, is associated with database schema 108 because the data view definition refers to database tables 24 and 26, which come from database schema 108. Data view definition 114, identified as view HR2, accesses another data view definition, namely 112, and can be mapped to either database schema 106 or 108 to access database table 22, which is replicated on both database schemas. Data view definition 120, likewise, accesses another data view definition, namely 118, and can be mapped to either database schema 106 or 108. Data view definition 116 only references data view definitions 112 and 118. Data view definition 122 includes a reference to database table 12 in database schema 106 and another reference to database table 28 in database schema 108.

The data model 102, however, is associated with only one authoring schema, namely SCHM_ERP. Accordingly, the schema mapping module 104 will map SCHM_ERP to database schema 106 when the data view definitions 112-122 are processed to generate their respective views. Views from data view definitions 112 and 114 can be produced because the database tables referenced in the data view definitions come from database schema 106.

As for the other data view definitions 116-122, however, views cannot be successfully generated because these data view definitions include references to database tables that are no longer come from database schema 106 but rather are found in database schema 108. For example, data view definition 118, identified by the identifier view FIN1, will fail to generate a view because the schema mapping module 104 will map to database schema 106 to access database tables 24 and 26, but will find that these database tables are empty. The data view definitions 116 and 120, identified by respective identifiers view HR3 and view FIN2, will also fail to generate a view because one of their database table references is data view definition 118, which as explained above will fail. Finally, the data view definition 122, identified by the identifier view FIN3, will fail because it references database table 28, which, in database schema 106, is empty.

FIG. 2D illustrates the mapping if schema mapping module 104 is configured to map SCHM_ERP to database schema 108 instead of database schema 106. While views can now be generated from data view definitions 118 and 120, the data view definitions 112-116 and 122 will fail because they ultimately reference database tables, which in database schema 108, are empty tables.

Referring back to FIG. 1 for a moment, the conventional schema mapping module 104 performs "schema-level" mapping, which is to say that one schema is mapped to another schema. The table below illustrates schema-level mapping information for mapping the authoring schemas (used by the provider) to physical schemas (defined in the customer's system) for the configuration depicted in FIG. 1:

TABLE

| authoring schema | physical schema |
|---|---|
| SCHM_ERP | ERP_01 |
| SCHM_HA1 | HA_MASTER |
| SCHM_HA2 | HA_MASTER |

In accordance with principles of the present disclosure, a mapping module may be provided with enhanced mapping information to perform schema mapping on several levels, including schema-level mapping. Referring FIGS. 3A and 4, suppose the authoring schema for the data model 402 shown in FIG. 4 is named SCHM_ERP00. The schema-level mapping information for the configuration shown in the figure may be depicted in mapping table 302 of FIG. 3A, where the authoring schema SCHM_ERP00 is mapped to physical schema SCHMA, which is an identifier for database schema 106 in system 400.

Figure 3A:
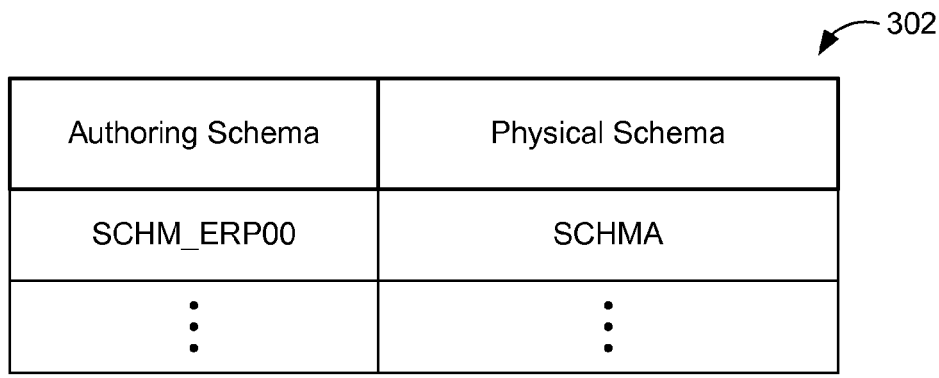
FIGS. 3A, 3B, and 3C illustrate schema mapping information tables.
Figure 3B:
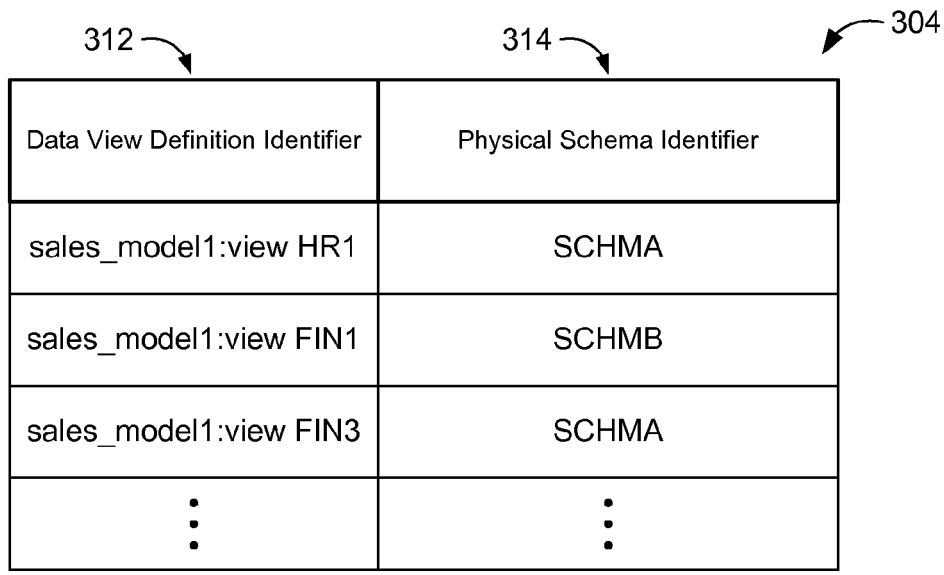
Figure 4:
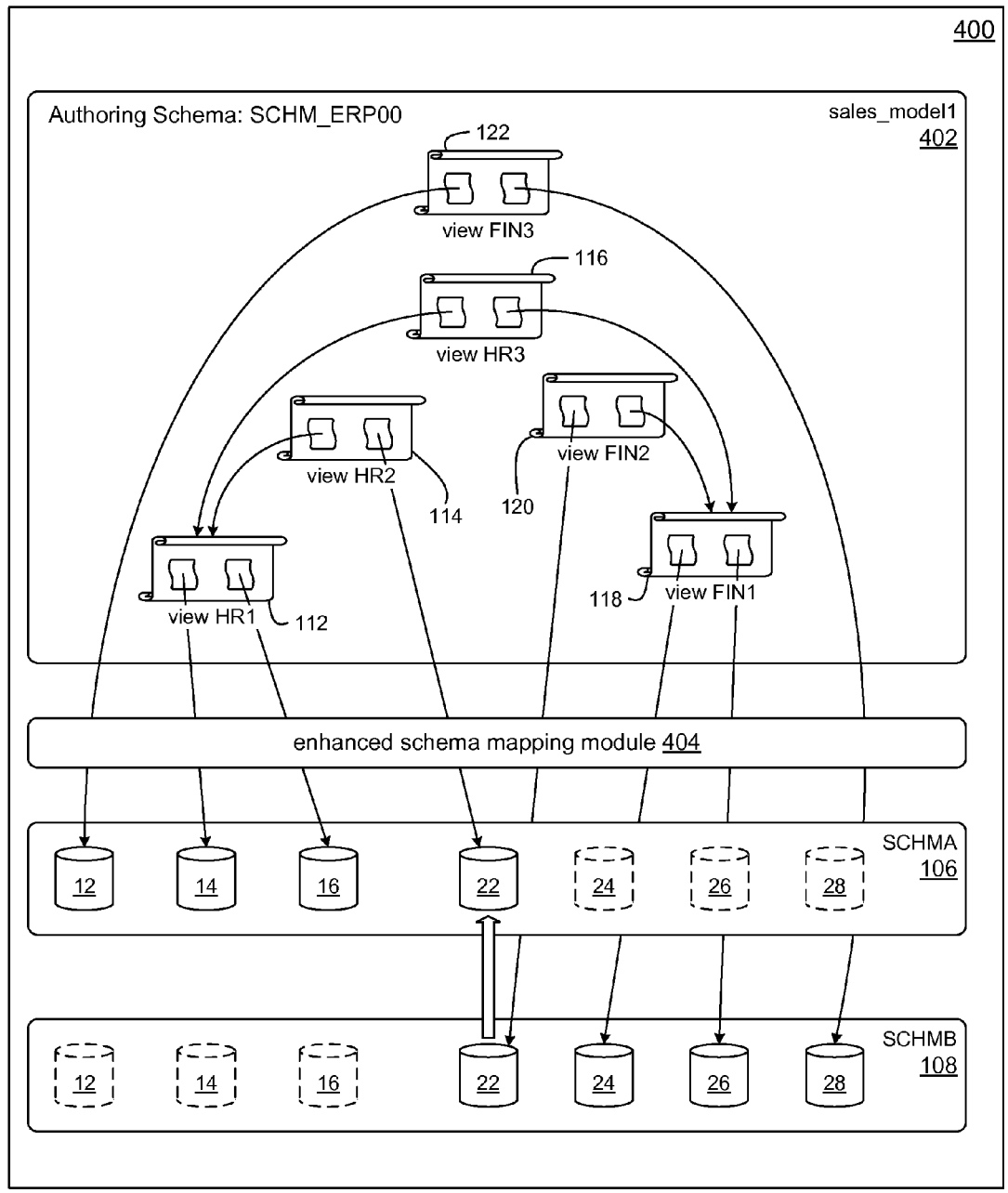
FIG. 4 illustrates system in accordance with the present disclosure.

Referring to FIGS. 3B and 4, in some embodiments, system 400 may include an enhanced schema mapping module 404 that incorporates data view-level mapping information, in addition to the schema-level mapping information shown in FIG. 3A. Data view-level mapping information provides schema mapping based on the data view that is being processed. Mapping table 304 in FIG. 3B illustrates an example of data view-level mapping information. The mapping table 304 comprises a column 312 of data view definition identifiers and a column 314 of physical schema identifiers. Column 312 may list one or more data view definitions contained in one or more data models that are installed in the system 400. In some embodiments, an identifier for a data view definition may comprise two components: the name of the data model that contains the data view definition and the name of the data view definition itself. Referring to FIG. 4, for example, suppose the data model 402 is named sales_model1. The data view definition 112 may be listed in mapping table 304 as sales_model1:view HR1.

For each data view definition listed in column 312, the database schema that is associated with the listed data view definition may be identified in column 314. Referring to FIG. 4, for example, the data view definition 112 (view HR1) references database tables 14 and 16, which come from database schema 106 (SCHMA). Accordingly, the mapping table 304 in FIG. 3B maps the identifier sales_model1:view HR1 to the identifier SCHMA. Likewise, the identifier for data view definition 118 (sales_model1:view FIN1) maps to the identifier SCHMB because the data view definition references database tables 24 and 26, which come from database schema 108, which is named SCHMB. The mapping table 304 includes an entry for sales_model1:view FIN3, which will be discussed below in connection with FIG. 3C.

Continuing with the discussion of FIGS. 3B and 4, it can be seen that the mapping information in mapping table 304 allows for views to be generated from data view definitions 112-120. For example, using mapping table 304, the schema mapping module 404 can correctly associate data view definition 112 with database schema 106 so that database tables 14 and 16 found in the database schema can be accessed for view generation. Likewise, the schema mapping module 404 can correctly associate data view definition 118 with database schema 108 so that database tables 24 and 26 found in the database schema can be accessed for view generation. Since, the data view definitions 112 and 118 can produce views, so too can data view definitions 114, 116, and 120, which rely on either or both of data view definitions 112 and 118, produce views.

Referring to FIGS. 2C and 2D for a moment, recall that the schema mapping module 104 can only provide mapping to one database schema (either 106 or 108, depending on how the schema mapping module is configured) when processing the data view definitions 112-122 contained in data model 102. Thus, if database schema 106 is selected, then only data view definitions 112 and 114 can generate views; the other data view definitions 116-122 will fail. Conversely, if database schema 108 is selected, then only data view definitions 118 and 120 can generate views. Moreover, it can be appreciated that views for data view definitions 116 and 122 cannot be produced irrespective of how the schema mapping module 104 is configured because data view definitions require access to both database schemas 106 and 108, which the schema mapping module 104 cannot do. Returning to FIGS. 3B and 4, by comparison, the schema mapping module 404 can use the data view-level mapping information contained in mapping table 304 to map to both database schemas 106 and 108 and thus generate views from data view definitions 112-120.

Consider now the data view definition 122. The mapping table 304 includes an entry for data view definition 122, namely sales_model1:view FIN3. According to the mapping table 304, the schema mapping module 404 will map to database schema 106 (SCHMA) to access the database tables contained in SCHMA when processing the data view definition to produce a view. The data view definition 122 makes reference to database tables 12 and 28. Accesses to database table 12 will succeed because the database table comes from SCHMA. However, accesses to database table 28 will fail because the database table is not found in SCHMA, but rather is found in SCHMB.

Figure 3C:
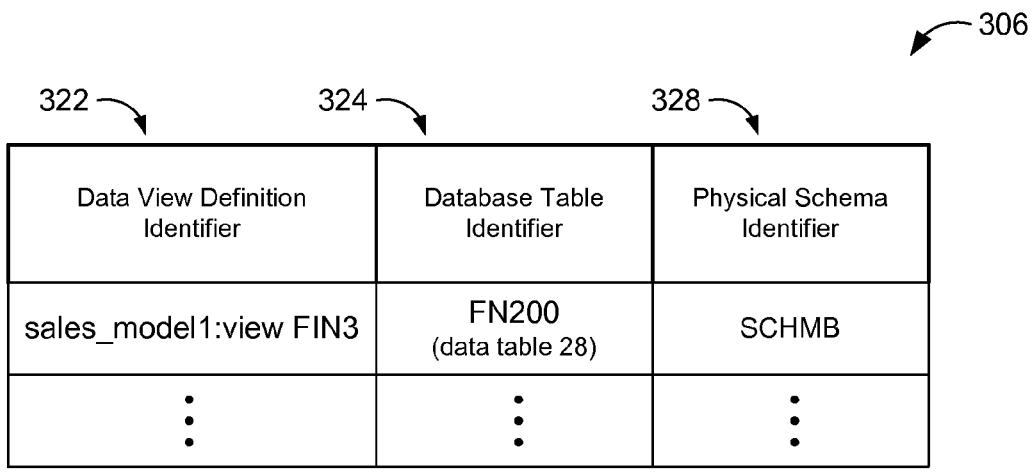

Referring to FIGS. 3C and 4, in some embodiments, the schema mapping module 404 may provide schema mapping at yet another level. Referring to FIG. 3C, a mapping table 306 provides database table-level mapping information, which, as the name suggests, provides schema mapping at the database table level. Mapping table 306 comprises a column 322 that identifies a data view definition (e.g., data view definition 122 shown in FIG. 4) and a column 324 that identifies a database table that is referenced by the data view definition. For example mapping table 306 includes an entry for database table 28, which is referenced by the data view definition 122. For discussion purposes, we can assume that the database table 28 is identified as FN200. A column 326 identifies the database schema that the database table comes from. For example, database table 28 is found in database schema 108, which is identified as SCHMB.

In accordance with principles of the present invention, the schema mapping module 404 may use mapping table 306 to provide a further level of schema mapping when processing the data view definition 122, which makes reference to database tables 12 and 28. As explained above, mapping table 304 provides access to database table 12 in SCHMA, but cannot provide access to database table 28, which comes from SCHMB. The mapping information in mapping table 306, however, provides the additional information that allows the schema mapping module 404 to provide a mapping of the database table 28 to SCHMB.

Figure 5:
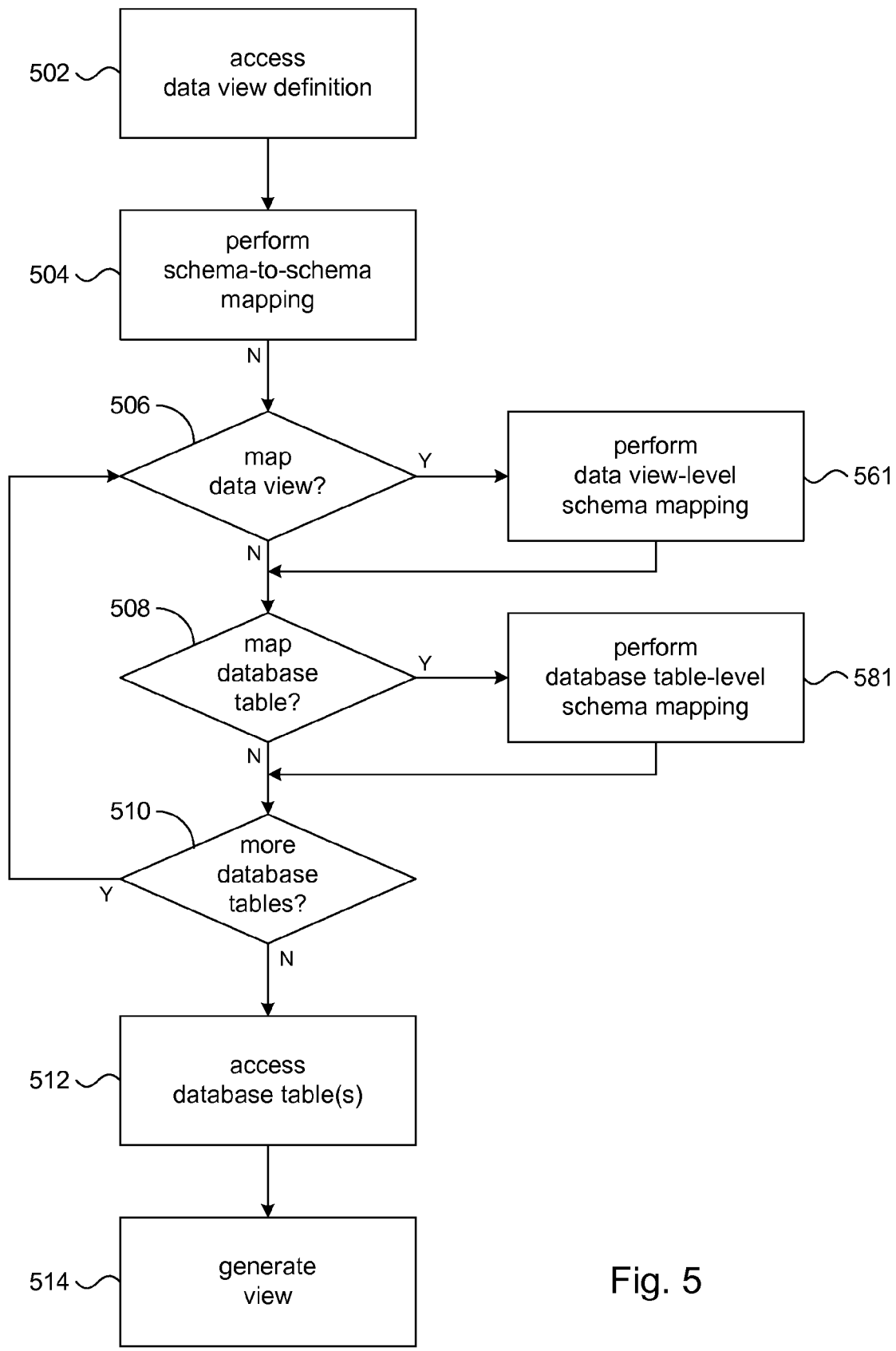
FIG. 5 illustrates a workflow of the system shown in FIG. 4.

The discussion will now turn to FIG. 5 for a description of a workflow in system 400 according to principles of the present disclosure for generating views from the data view definitions contained in a data model. In a step 502, the system 400 may access a selected data view definition. For example, a user may identify a data model and a view within the data model. The system 400 may access a corresponding data view definition contained in the data model from which the user-selected view may be generated.

In a step 504, the system 400 may map the authoring schema associated with the data view definition to a database schema in system 400. Recall that the authoring schema refers to the database schema that the provider used to develop the data model. The authoring schema may be identified in metadata associated with the data model that contains the data view definition or in metadata associated with the data view definition itself. The system 400 may use the mapping information contained in mapping table 302 (FIG. 3A) to identify the database (physical) schema in system 400 that corresponds to the authoring schema.

The system 400 may determine, in a step 506, whether to replace the physical schema obtained in step 504 with a different physical schema. In some embodiments, the system 400 may access the mapping table 304 (FIG. 3B). If the mapping table 304 contains an entry for the data view definition, then in a step 561, the system 400 may replace the physical schema obtained in step 504 with the physical schema obtained from the mapping table 304. Otherwise, processing by the system 400 proceeds to decision step 508 without changing the physical schema obtained from step 504.

The system 400 may determine in a step 508 whether to replace the physical schema resulting from step 506, which may be the physical schema obtained in step 504 or the physical schema obtained in step 561. The data view definition may make references to multiple database tables. Each database table is considered in turn. Accordingly, in step 508, the system 400 processes the particular database table that is currently being considered. In some embodiments, the system 400 may access mapping table 306 (FIG. 3C). If the mapping table 306 contains an entry for the database table currently being considered, then in a step 581, the system 400 may replace the physical schema from step 506 with the physical schema obtained from mapping table 306. Step 581 may conclude by establishing an association between the database table currently being considered and the physical schema obtained from mapping table 306. Otherwise, in step 508, if the mapping table 306 does not contain an entry for the currently referenced database table, then step 508 may conclude by establishing an association between the database table currently being considered and the physical schema from step 506.

In a step 510, if there are more that are referenced in the data view definition, then the system 400 may iterate steps 506, 561, 508, and 581 to process each additional database table that is referenced in the data view definition. When each database table in the data view definition has been processed, step 510 will evaluate to N, and processing will proceed to at step 512. At this time, each database table will be associated with a physical schema, either from the schema-level mapping information in mapping table 302 (step 504), from the data view-level mapping information in mapping table 304 (step 561), or from the database table-level mapping information in mapping table 306 (step 581). The system 400 may access data in the database tables (step 512) in accordance with the data view definition (e.g., SELECT, JOIN, etc.) to produce (step 514) a view from the data view definition.

In some embodiments, the system 400 may provide support for initializing and otherwise managing mapping tables 304 and 306. Consider mapping table 304, for example. Each data view definition may be tagged with information (e.g., in metadata associated with the data view definition) that identifies an application (e.g., business application, database, etc.) that the data view definition belongs to. A user interface (UI) may display to a user (e.g., administrative user) a list of data models that are stored on the system 400. The UI may display a list of data view definitions contained in a selected data model. Each data view definition in the selected data model may be displayed with its respective application tag. The UI may allow the user to sort the list of data view definitions, for example, according to their respective application tags. Since the user knows which database schemas in their system 400 (physical schemas) are assigned to which applications, they can readily identify the physical schemas that the data view definitions belong to, and manually assign a physical schema to a data view definition in the mapping table 304.

A similar UI may be provided to support the database table-level mapping information in mapping table 306. In some embodiments, the system 400 "knows" which applications (financial applications, manufacturing support applications, payroll, employee records, etc.) each database table in the system belongs to. For example, a financial application FIN_APP may create database tables FN100 and FN200, and by so doing the system 400 knows that database tables FN100 and FN200 "belong" to the application FIN_APP. The user may start up a UI and specify a data model. The UI may present to the user a list of the database tables contained in the specified data model. For each listed database table, the UI may display or otherwise identify its corresponding application (e.g., database tables FN100 and FN200 belong to application FIN_APP). The user may then assign the applications to a physical schema. In some embodiments, the UI may present a list of physical schemas that contain the database tables. The user may now easily see in which physical schemas the database tables contain real data (e.g., FIG. 2C, database schema 106, database table 12) and which physical schemas the database tables are empty (e.g., FIG. 2C, database schema 108, database table 12). The user can then decide which physical schema to assign to which database table.

In some embodiments, a check function may be provided that can generate a report on the mapping information contained in the mapping tables 302, 304, and 306. The check function may be performed on a given data view definition contained in a given data model. More specifically, the check function may detect all the database tables referenced in the given data view definition. The check function may process the workflow shown in FIG. 5 to identify the physical schema's that correspond to the to database tables in the given data view definition. The user may display or print the resulting report for review to verify the mapping information in the mapping tables 302-306 and, if necessary, make changes to the mapping information.

Figure 6:
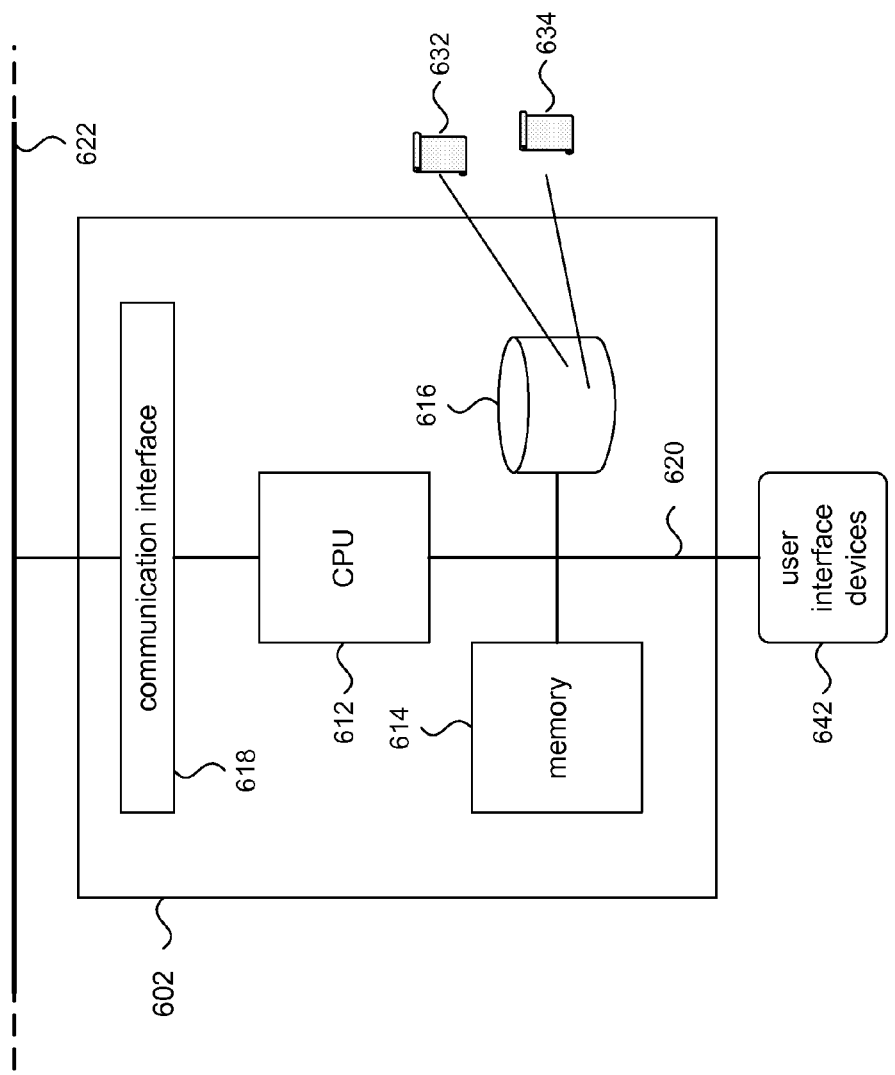
FIG. 6 illustrates a high level implementation of the system shown in FIG. 4.

A particular embodiment of the system 400 in accordance with the present disclosure is illustrated in FIG. 6, showing a high level block diagram of a computer system 602 configured to operate in accordance with the present disclosure. The computer system 602 may include a central processing unit (CPU) or other similar data processing component. The computer system 602 may include various memory components. For example, the memory components may include a volatile memory 614 (e.g., random access memory, RAM) and a data storage device 616. A communication interface 618 may be provided to allow the computer system 602 to communicate over a communication network 622, such as a local area network (LAN), the Internet, and so on. An internal bus 620 may interconnect the components comprising the computer system 602.

The data storage device 616 may comprise a non-transitory computer readable medium having stored thereon computer executable program code 632. The computer executable program code 632 may be executed by the CPU 612 to cause the CPU to perform steps of the present disclosure, for example the steps set forth in FIG. 5 for providing the various levels of schema mapping. The data storage device 616 may store various data structures 634 such as mapping table 302 comprising schema-level mapping information, mapping table 304 comprising data view-level mapping information, and mapping table 306 comprising database table-level mapping information. The data storage device 616 may include a database system comprising a repository of data models, one or more database schemas, and so on.

A user (e.g., an administrative user) may interact with the computer system 602 using suitable user interface devices 642. They may include, for example, input devices such as a keyboard, a keypad, a mouse or other pointing device, and output devices such as a display. For example, the user can configure the tables 304 and 306, perform a check function and so on.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method comprising operating a user computer system with executable program instructions to perform steps of:
   receiving from a provider computer system separate from the user computer system a first data view definition comprising first database tables that reference database schemas of the provider computer system using first schema identifiers;
   storing the first data view definition with a plurality of data view definitions stored on the user computer system, including associating the first database tables of the first data view with database schemas of the user computer system using second schema identifiers different from the first schema identifiers;
   accessing the first data view definition from among the stored data view definitions;
   accessing data from the first database tables referenced in the first data view definition, including mapping the first schema identifiers referenced by the first database tables to the second schema identifiers in order to access the database schemas in the user computer system; and
   generating a view of the first data view definition using at least the data accessed from the database tables.

2. The method of claim 1 wherein accessing data from a first database table referenced in the first data view definition comprises:
   determining a database schema name that corresponds to the identifier that identifies the first data view definition or the identifier that identifies the first database table;
   accessing the first database schema using the database schema name; and
   accessing the first database table that comes from the first database schema.

3. The method of claim 1 further comprising accessing data from a second database table referenced in the first data view definition, wherein the second database table comes from a second database schema that is different from the first database schema, wherein generating a view of the first data view definition further includes using the data accessed from the second database table.

4. The method of claim 3 wherein the second database schema is identified using an identifier that identifies the second database table.

5. The method of claim 1 further comprising storing schema mapping information comprising a plurality of identifiers that identify each of the data view definitions, each identifier being associated with a database schema, wherein the first database schema is identified from the schema mapping information using the identifier that identifies the first data view definition.

6. The method of claim 1 further comprising storing schema mapping information comprising a plurality identifiers that identify each of the database tables referenced among the plurality of data view definitions, each identifier being associated with a database schema, wherein the first database schema is identified from the schema mapping information using the identifier that identifies the first database table.

7. The method of claim 1 further comprising:
presenting to a user information relating to one or more of the data view definitions;
for each data view definition presented to the user, receiving information from the user representative of an identifier that identifies a database schema; and
storing a mapping between an identifier that identifies the presented data view definition and the identifier received from the user.

8. The method of claim 1 further comprising:
presenting to a user information relating to one or more database tables referenced by a given data view definition;
for each database table presented to the user, receiving information from the user representative of an identifier that identifies a database schema; and
storing a mapping between an identifier that identifies the presented database table and the identifier received from the user.

9. A database system comprising:
computing device comprising a processor; and
a storage system having stored thereon computer executable program code, which, when executed by the computing device, causes the computing device to:
receive from a provider computer system separate from the database system a first data view definition comprising first database tables that reference database schemas of the provider computer system using first schema identifiers;
store the first data view definition with a plurality of data view definitions stored on the database system, including associating the first database tables of the first data view with database schemas of the database system using second schema identifiers different from the first schema identifiers;
access flail the first data view definition from among the stored data view definitions;
access data from the first database tables referenced in the first data view definition, including mapping the first schema identifiers referenced by the first database tables to the second schema identifiers in order to access the database schemas in the user computer system; and
generate a view of the first data view definition using at least the data accessed from the database tables.

10. The database system of claim 9 wherein to access data from a first database table referenced in the first data view definition, the computer device:
determines a database schema name that corresponds to the identifier that identifies the first data view definition or the identifier that identifies the first database table;
accesses the first database schema using the database schema name; and
accesses the first database table that comes from the first database schema.

11. The database system of claim 9 wherein the computer executable program code, when executed, further causes the computing device to access data from a second database table referenced in the first data view definition, wherein the second database table comes from a second database schema that is different from the first database schema, wherein generating a view of the first data view definition further includes using the data accessed from the second database table.

12. The database system of claim 11 wherein the second database schema is identified using an identifier that identifies the second database table.

13. The database system of claim 9 wherein the computer executable program code, when executed, further causes the computing device to store schema mapping information comprising a plurality of identifiers that identify each of the data view definitions, each identifier being associated with a database schema, wherein the first database schema is identified from the schema mapping information using the identifier that identifies the first data view definition.

14. The database system of claim 9 wherein the computer executable program code, when executed, further causes the computing device to store schema mapping information comprising a plurality identifiers that identify each of the database tables referenced among the plurality of data view definitions, each identifier being associated with a database schema, wherein the first database schema is identified from the schema mapping information using the identifier that identifies the first database table.

15. The database system of claim 9 wherein the computer executable program code, when executed, further causes the computing device to:
present to a user information relating to one or more of the data view definitions;
for each data view definition presented to the user, receive information from the user representative of an identifier that identifies a database schema; and
store a mapping between an identifier that identifies the presented data view definition and the identifier received from the user.

16. The database system of claim 9 wherein the computer executable program code, when executed, further causes the computing device to:
present to a user information relating to one or more database tables referenced by a given data view definition;
for each database table presented to the user, receive information from the user representative of an identifier that identifies a database schema; and
store a mapping between an identifier that identifies the presented database table and the identifier received from the user.

17. A non-transitory computer readable storage medium comprising executable program code, which when executed by a user computer system, causes the user computer system to perform steps of:
receiving from a provider computer system separate from the user computer system a first data view definition comprising first database tables that reference database schemas of the provider computer system using first schema identifiers;

storing the first data view definition with a plurality of data view definitions stored on the user computer system, including associating the first database tables of the first data view with database schemas of the user computer system using second schema identifiers different from the first schema identifiers;

accessing the first data view definition from among the stored data view definitions;

accessing data from the first database tables referenced in the first data view definition, including mapping the first schema identifiers referenced by the first database tables to the second schema identifiers in order to access the database schemas in the user computer system; and generating a view of the first data view definition using at least the data accessed from the database tables.

18. The non-transitory computer readable storage medium of claim 17, wherein accessing data from a first database table referenced in the first data view definition comprises the user computer system:

determining a database schema name that corresponds to the identifier that identifies the first data view definition or the identifier that identifies the first database table;

accessing the first database schema using the database schema name; and accessing the first database table that comes from the first database schema.

19. The non-transitory computer readable storage medium of claim 17, wherein the user computer system accesses data from a second database table referenced in the first data view definition, wherein the second database table comes from a second database schema that is different from the first database schema, wherein generating a view of the first data view definition further includes using the data accessed from the second database table.

20. The non-transitory computer readable storage medium of claim 19, wherein the second database schema is identified using an identifier that identifies the second database table.

* * * * *